US007743673B2

(12) United States Patent
Wagner et al.

(10) Patent No.: US 7,743,673 B2
(45) Date of Patent: Jun. 29, 2010

(54) METHOD FOR THE ANGLE-CONTROLLED TURNING OF A PART

(75) Inventors: Paul-Heinz Wagner, Much-Birrenbachshoehe (DE); Ulf Sittig, Nuembrecht (DE); Guenter Andres, Much (DE); Bernd Thelen, Much (DE)

(73) Assignee: Wagner Vermögensverwaltungs-GmbH & Co. KG, Much (DE)

( * ) Notice: Subject to any disclaimer, the term of this patent is extended or adjusted under 35 U.S.C. 154(b) by 253 days.

(21) Appl. No.: 11/578,065

(22) PCT Filed: Apr. 7, 2005

(86) PCT No.: PCT/EP2005/003628

§ 371 (c)(1), (2), (4) Date: Aug. 8, 2008

(87) PCT Pub. No.: WO2005/099964

PCT Pub. Date: Oct. 27, 2005

(65) Prior Publication Data

US 2009/0000397 A1 Jan. 1, 2009

(30) Foreign Application Priority Data

Apr. 14, 2004 (DE) ...................... 10 2004 017 979

(51) Int. Cl.
*G01D 1/00* (2006.01)

(52) U.S. Cl. .................................................. 73/862.23

(58) Field of Classification Search .............. 73/862.23, 73/862.21

See application file for complete search history.

(56) References Cited

U.S. PATENT DOCUMENTS

| | | | | |
|---|---|---|---|---|
| 4,794,825 | A * | 1/1989 | Schmoyer | 81/57.39 |
| 4,941,362 | A * | 7/1990 | Tambini | 73/862.23 |
| 5,668,328 | A | 9/1997 | Steber et al. | |
| 5,792,967 | A | 8/1998 | Steber et al. | |
| 6,546,839 | B1 * | 4/2003 | Jamra et al. | 91/443 |
| 7,000,486 | B2 * | 2/2006 | Wagner et al. | 73/862.21 |
| 2004/0177704 | A1 | 9/2004 | Wagner et al. | |
| 2005/0210872 | A1 | 9/2005 | Wagner | |

FOREIGN PATENT DOCUMENTS

| | | | |
|---|---|---|---|
| DE | 198 13 900 | A1 | 9/1999 |
| DE | 102 22 159 | A1 | 11/2003 |
| EP | 0 918 597 | B1 | 2/1999 |
| WO | WO03 013 797 | A1 | 2/2003 |

* cited by examiner

*Primary Examiner*—Lisa M Caputo
*Assistant Examiner*—Octavia Davis
(74) *Attorney, Agent, or Firm*—Miles & Stockbridge P.C.; David R. Schaffer, Esq.

(57) ABSTRACT

A power wrench (10) for turning a screw is supplied by a hydraulic unit (25) that contains a positive displacement pump (26) and supplies a defined rate of flow. The pressure in a hydraulic pressure line (28) is measured by a pressure sensor (32) and provided to a control unit (31). The volume flow of the hydraulic unit (25) is determined in amount per unit of time. The piston stroke per unit of time can be determined due to the fact that the filling volume of the hydraulic cylinder is known. The piston acts upon a lever system that turns the moving part. The turning angle per unit of time can be determined due to the fact that the lever length is known. This makes it possible to dispense with an angle measuring device and to determine the turning angle merely by measuring pressure.

4 Claims, 2 Drawing Sheets

METHOD FOR THE ANGLE-CONTROLLED TURNING OF A PART

BACKGROUND OF THE INVENTION

Figure 1:
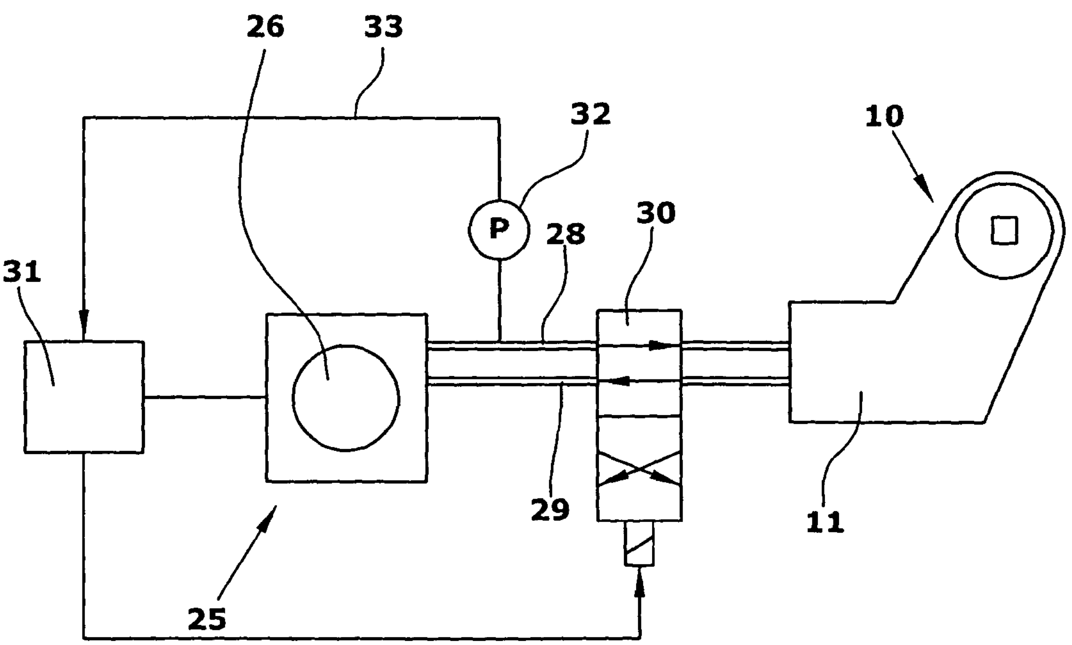

The invention is directed to a method for the angle-controlled turning of a part using a hydraulic piston/cylinder drive and a ratchet, and in particular to a method for operating a hydraulic power wrench.

WO 03/013797 A1 describes a method for controlling an intermittent screwing operation wherein a hydraulic power wrench with a piston/cylinder unit tightens a screw in several strokes. The screwing operation is divided into a torque mode effective until a predetermined assembly torque is reached, and a turning angle mode wherein, starting from the assembly torque, the screw is turned further through a predetermined angle. The power wrench is equipped with a torque sensor and a turning angle sensor. Such sensors represent an additional effort and implicate that only certain types of power wrenches can be used to implement this method.

A method from which the precharacterizing part of claim 1 starts is known from U.S. Pat. No. 5,668,328. Here, the angular variable of the hydraulic power wrench is used to determine the turning angle. The method assumes that the flow rate is constant and that the entire volume flow supplied is thus proportional to time. The turning angle of the power wrench is determined by a time measurement. Thereby, corresponding angle sensors may be dispensed with.

DE 198 13 900 A1 describes a method wherein the screw is tightened smoothly and without control until an assembly point is reached where the different parts of the screw connection are in snug fit. Thereafter, the screw tightening angle is measured, which is increased in several strokes, the durations of the individual strokes being accumulated. It is not detailed how reaching the assembly point is determined. It may be effected by detecting the transition from a smooth drive to a higher load and defining this as the assembly point.

SUMMARY OF THE INVENTION

It is an object of the invention to provide a method for the angle-controlled turning of a turnable part, wherein the beginning of the turning angle measurement is clearly defined.

It is an object of the invention to provide a method for the angle-controlled turning of a turnable part that requires no angle sensor and can thus be implemented in a simple manner and without restriction to a certain piston/cylinder drive.

The present method for the angle-controlled turning of a turnable part using a hydraulic piston/cylinder drive and a ratchet as shown and described herein.

According to the invention, the angular speed is determined prior to a working operation as a relation between the turning angle and the turning time for a defined volume flow supplied to the linear drive. Thereafter, in a working operation, the linear drive is supplied with a defined volume flow while measuring the duration. In a turning angle mode, the turning angle is determined from the period and the angular speed.

To implement this method concerning the turning angle mode, neither a sensor nor a measuring device is required at the mechanical turning device. What is measured is merely the duration of the supply of hydraulic fluid at a defined volume flow. Thus, measuring the angular rotation is reduced to a time measurement.

In a calibrating operation in which the piston/cylinder drive is supplied a defined volume flow, the "turning angle per unit time" is determined for this volume flow, prior to a working operation. The turning angle per unit time can be determined experimentally by measuring the turning angle or it may also be calculated. The calculation is effected such that the turning angle per unit time is calculated from the filling volume of the hydraulic cylinder, the defined volume flow supplied to the piston/cylinder drive and the lever length of the lever system turning the turnable part. Of course it is also possible to determine the reciprocal value, i.e. the "time per degree of turning angle". In any case, a time measurement is carried out and the turning is stopped when the time measurement indicates the covering of the desired angular range. The desired turning angle may also be programmed before starting the working. Using a comparison between the set value and an actual value, the operation can be switched off after the desired turning angle has been reached.

The defined volume flow can be generated by a hydraulic aggregate including a positive displacement pump or a volumetric pump, such as a gear pump, for example. A volumetric pump supplies a volume flow that is proportional to the speed of rotation of the pump. A desired volume flow can be obtained by controlling the speed of rotation of the pump.

In the simplest case, the defined volume flow is a constant volume flow. It may be varied according to a predefined time program or depending on a measurand, for example the pressure of the hydraulic medium.

A torque mode is carried out prior to the turning angle mode, wherein the turnable part is turned until a determinable pressure value corresponding to an assembly torque is reached, while the piston/cylinder drive is supplied with a defined volume flow.

The torque mode is terminated when the pressure built up at the piston/cylinder drive has reached a value corresponding to the assembly torque. The torque is measured using the pressure in the hydraulic system supplying the piston/cylinder drive. This pressure increases proportional to the section modulus of the part to be turned so that it can be used for a torque measurement. However, a torque measurement is no longer possible at the times when the piston of the piston/cylinder drive abuts the stop. Then, the drive means has to be switched to reverse, whereby the piston makes its return stroke.

In a preferred development of the invention it is provided that a basic characteristic is determined when the piston/cylinder drive is unloaded, the characteristic indicating the temporal course of the pressure and having an ascending portion caused by the blocking of the piston/cylinder drive. The piston/cylinder unit is reversed when the slope of the temporal course of the pressure in the current working operation equals the slope of the ascending portion of the basic characteristic. Generally, the blocking of the piston at the end of a piston stroke is detected on the basis of a rapid increase in pressure. When this happens, the return stroke of the piston is initiated to afterwards start the next piston stroke. Again, this requires a mere measurement of the hydraulic pressure. No pressure sensor is required.

In the turning angle mode, measuring the duration can be effected over at least two piston strokes. According to a preferred embodiment of the invention, it is provided that, at the end of a piston stroke, the measured value of the duration is stored and accepted as the initial value for the next piston stroke. Thus, the covered turning angles are accumulated so that the desired turning angle at which turning should be stopped is determined with high accuracy.

The following is a detailed description of an embodiment of the invention with reference to the drawings. These explanations should not be construed as limiting the scope of protection of the invention. Rather, the same is defined by the claims and their equivalents.

Figure 2:
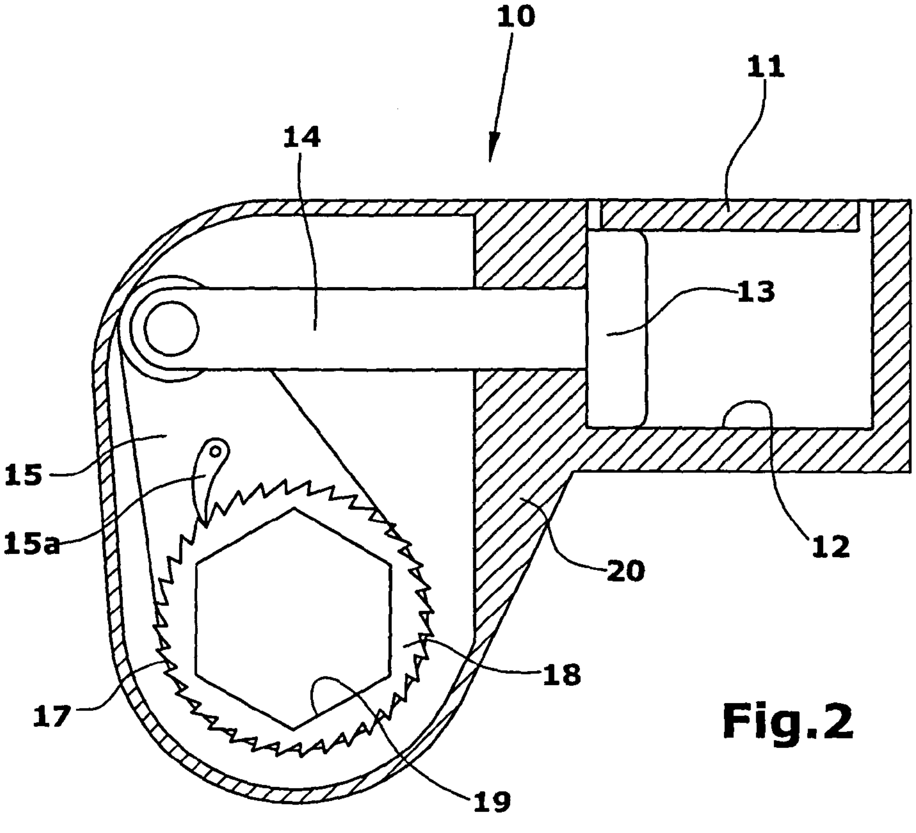
Figure 3:
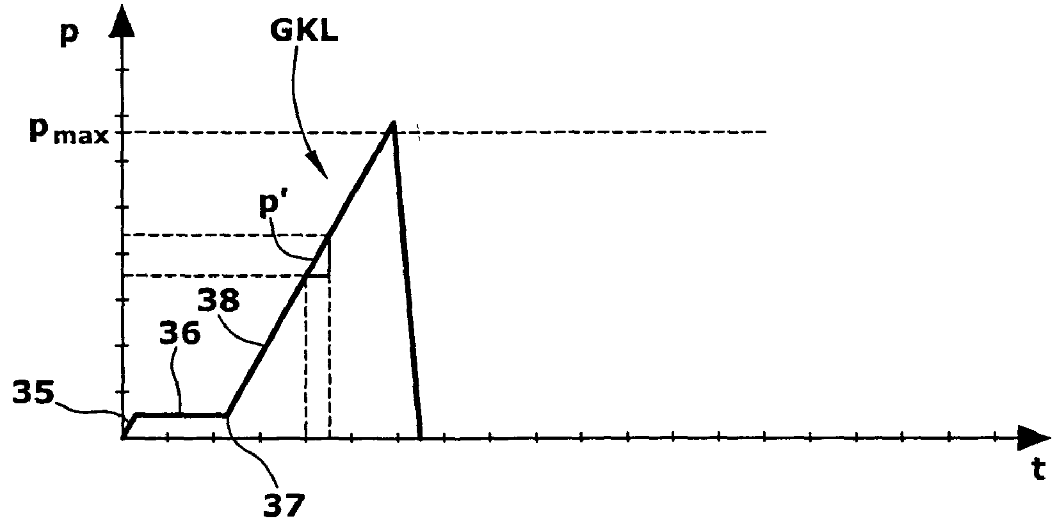
Figure 4:
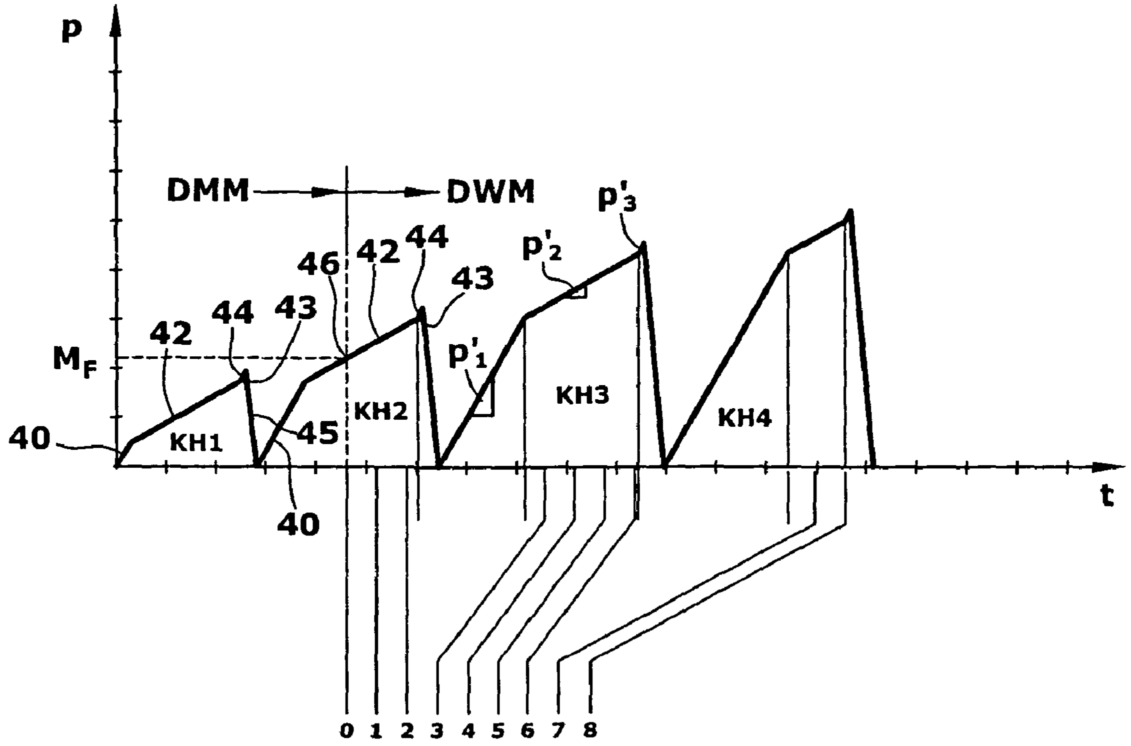

In the Figures:

FIG. 1 illustrates a schematic embodiment of a screwing device with a hydraulic aggregate and a power wrench for turning a screw, and FIG. 2 is a schematic illustration of the power wrench including the piston/cylinder drive, and FIG. 3 shows an example of a basic characteristic of the hydraulic system comprised of the pressure aggregate, the connection hoses and the piston/cylinder drive, and FIG. 4 is a chart of the temporal course of a working operation made up by several piston strokes.

FIGS. 1 and 2 schematically illustrate a power wrench 10. It comprises a hydraulic piston/cylinder drive 11 with a hydraulic cylinder 12 and a piston 13 movable therein. The piston is connected with a piston rod 14, and the end of the piston rod engages a lever 15 which has a detent 15*a* engaging a toothing of a ratchet wheel 17. The ratchet wheel 17 is part of an annular member 18 having a socket 19 for the insertion of a socket wrench or a screw head to be turned. Through a reciprocating movement of the piston 13, the annular member 18 is turned, and the screw together therewith. The annular member 18 is supported in a housing 20 that also accommodates the piston/cylinder drive 11.

The pressure for the piston/cylinder drive 11 is supplied by the hydraulic aggregate 25 illustrated in FIG. 1, which includes a positive displacement pump 26, e.g. a gear pump, a speed-controlled synchronous motor and a tank. The hydraulic aggregate 25 is connected to a pressure line 28 and a return line 29. These two lines are connected with the piston/cylinder drive 11 through a control valve 30. By switching the control valve 30, the piston 13 may be moved either forward or backward.

The control device 31 is provided for the control of the hydraulic aggregate 16 and the control valve 30. It includes a frequency converter generating a variable drive frequency for the motor. The control device 31 thus determines the speed of the pump 17. The pump speed determines the volume flow Q that is supplied to the pressure line 28.

The pressure line 28 is provided with a pressure sensor 32 that measures the hydraulic pressure p in the pressure line. The pressure sensor is connected with the control device 31 through a line 33.

In the control device 31, the basic characteristic GKL of the hydraulic system illustrated in FIG. 3 is represented, which indicates the pressure p as a function of time t for a given volume flow (or a given pump speed). For other volume flows or pump speeds, this curve can be shifted correspondingly.

The basic characteristic GKL was recorded for the respective hydraulic circuit from the same aggregates and hoses. The basic characteristic is obtained during an idle stroke of the piston 13 at a constant volume flow. First, a short increase in pressure occurs in section 35 to overcome friction. This is followed by a section 36 of constant pressure during the idle stroke. At the point 37, the piston has reached the stop so that it is then blocked and a linear increase in pressure occurs in section 38. When the maximum pressure $p_{max}$ has been reached, the return stroke is performed during which the pressure at the pressure sensor 32 falls to zero. The section 38 is the rising section. The pressure gradient $$p' = \frac{dp}{dt}$$

between two moments in time is measured and stored in the control device 31.

FIG. 4 illustrates a working operation of the power wrench, comprising a total of 4 piston strokes KH1-KH4. The pressure curve p of the pressure sensor 32 is plotted over time t. The piston stroke KH1 has a starting section 40 corresponding to the section 35 of FIG. 3. This is followed by a section 42 in which the screw is turned but no high load moment is generated. At point 43, the piston 13 abuts the front stop. This results in a steeper pressure build-up represented by the section 44. During the screwing operation, the pressure change in section 42 is measured at intervals, thereby determining the gradient dp/dt. If this gradient is less than the value p' in FIG. 3, the blocked state is not yet reached, i.e. the screw still turns. By comparing the gradient in section 42 to the gradient p' of the basic characteristic GKL, it is determined, whether the blocked state is reached.

In section 44, the blocked state is reached so that section 45 follows in which the return stroke of the piston occurs. Thereafter, the next piston stroke KH2 ensues.

In the piston stroke KH2, the starting section 40 is longer than in the previous piston stroke, namely until the torque reached at point 44 in KH1 is reached again. Only then does the section 42 begin win which the screw is turned against a turning resistance.

As long as the piston is not blocked, the pressure p measured at the pressure sensor 32 corresponds to the torque acting on the screw. Thus, a pressure value can be determined that corresponds to an assembly torque $M_F$. When this pressure is reached, for example at point 46 in FIG. 4, a transition is made from the torque mode DMM, in which the torque is monitored, to the turning angle mode DWM, in which a turning through a defined angular range is performed, the transition occurring without the screwing operation being interrupted. A time measurement is commenced at the beginning of the turning angle mode DWM. This is indicated by the uniform intervals 0-6 in FIG. 4.

The time measurement is based on the following idea: The volume flow of an aggregate is determined as volume per unit time. Since the filling amount of the hydraulic cylinder is known, it is possible to determine the piston travel per unit time. The piston acts on a lever system that eventually turns the screw. Since the lever length is known, the turning angle per unit time can be determined. Given the same volume flow, the same hose length and the same power wrench, the time for 1° (angular degree) can be defined. For example, this time is 64 ms per 1°. As this time lapses while the screw is turned, on angular degree is counted, respectively, and added to the angular degrees covered until then. The intervals numbered 0-8 in FIG. 4 each correspond to one angular degree.

At the end of the piston stroke KH2, i.e. at point 43, only a part of the 64 ms of an interval has lapsed. The respective counter value is stored before the return stroke is performed. The interval 2 is interrupted at this point and is continued in the next piston stroke KH3 at point 48 when the pressure p has reached the same level at which the effective part of the piston stroke KH2 has been ended. Thus, the interval 2 will then be counted on from point 48 to the final value. Thereafter, the interval 3 starts, followed by the intervals 4, 5, 6. The interval

6 is also interrupted by the end of the effective part of the piston stroke KH3 and is continued only during the next piston stroke KH$ as soon as the pressure has built up to a corresponding high level. In this manner, the number of time intervals can be defined that have to be passed after having reached the assembly torque $M_F$. This number corresponds to the desired range of turning angles.

FIG. 4 illustrates the gradient $$p'1 = \frac{dp}{dt}$$

of the section 40, which has to be reached for the power wrench to again engage the screw and for the moment, with which the previous piston stroke has ended, to be exceeded. Thereafter, the rising decreases in section 42 in which the screw is tightened, until the blocked state of the piston is reached and the gradient p'3 is obtained that is equal to the gradient p' in FIG. 3.

In the above described screwing method, the screw is tightened until the assembly torque $M_F$ is reached by determining the torque from the pressure p measured, and it is eventually turned further through a determined turning angle. Prior to the beginning of the screwing operation, the assembly torque and the turning angle are input manually. These values are the set values for the screwing operation.

The turning angle method of the present invention can also be practiced without a preceding torque mode, i.e. as a pure angular rotation. Further, it is not limited to screwing operations. Rather, pipes and rods may also be turned hydraulically against a torsion resistance.

What is claimed is:

1. A method for the angle-controlled turning of a turnable part using a hydraulic piston/cylinder drive and a ratchet, the method comprising: prior to a working operation, the angular speed being determined as the relationship between the turning angle and the turning time at a defined volume flow being supplied to the piston/cylinder drive; in the subsequent working operation, the piston/cylinder drive being supplied with a defined volume flow and the duration being measured; in a turning angle mode, the turning angle being determined from the duration and the angular speed; prior to performing the turning angle mode, a torque mode being performed, including the turning part being turned until an assembly torque is reached; the piston/cylinder drive being supplied with a defined volume flow; and the torque mode being stopped when the pressure built up at the piston/cylinder drive has reached a value corresponding to the assembly torque.

2. The method of claim 1, wherein a basic characteristic is determined when the piston/cylinder drive is not loaded, the basic characteristic indicating the temporal course of the pressure and having an ascendant section caused by the blocking of the piston/cylinder drive, and that a reversal of the piston/cylinder drive is effected when the rising of the temporal course of the pressure in the current working operation is equal to the rising of the ascendant section of the basic characteristic.

3. The method of claim 2, wherein in the turning angle mode, the duration is measured for at least two piston strokes.

4. The method of claim 3, wherein at the end of a piston stroke the measured value of the duration is stored and accepted as the initial value for the next piston stroke.

* * * * *